(12) United States Patent
Fujimaki et al.

(10) Patent No.: US 10,877,996 B2
(45) Date of Patent: Dec. 29, 2020

(54) CLUSTERING SYSTEM, METHOD, AND PROGRAM

(71) Applicant: NEC Corporation, Tokyo (JP)

(72) Inventors: Ryohei Fujimaki, Tokyo (JP); Yousuke Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 521 days.

(21) Appl. No.: 15/549,897

(22) PCT Filed: Jan. 27, 2016

(86) PCT No.: PCT/JP2016/000403
§ 371 (c)(1),
(2) Date: Aug. 9, 2017

(87) PCT Pub. No.: WO2016/132683
PCT Pub. Date: Aug. 25, 2016

(65) Prior Publication Data
US 2018/0025072 A1    Jan. 25, 2018

Related U.S. Application Data

(60) Provisional application No. 62/117,659, filed on Feb. 18, 2015.

(51) Int. Cl.
| G06F 7/00 | (2006.01) |
| G06F 16/28 | (2019.01) |
| G06F 16/22 | (2019.01) |
| G06N 5/00 | (2006.01) |
| G06N 20/00 | (2019.01) |
| G06Q 30/02 | (2012.01) |
| G06N 7/00 | (2006.01) |

(52) U.S. Cl.
CPC ........ G06F 16/285 (2019.01); G06F 16/2246 (2019.01); G06N 5/003 (2013.01); G06N 20/00 (2019.01); G06Q 30/0201 (2013.01); G06N 7/005 (2013.01)

(58) Field of Classification Search
CPC ... G06F 16/285; G06F 16/2246; G06N 20/00; G06N 5/003; G06N 7/005; G06Q 30/0201
See application file for complete search history.

(56) References Cited

U.S. PATENT DOCUMENTS

| 8,412,656 B1* | 4/2013 | Baboo | G06Q 30/0201 706/20 |
| 9,600,831 B1* | 3/2017 | Chou | G06Q 30/0242 |
| 2014/0188830 A1* | 7/2014 | deVille | G06F 16/355 707/706 |

OTHER PUBLICATIONS

International Search Report dated Apr. 12, 2016, in corresponding PCT International Application.

(Continued)

*Primary Examiner* — Azam M Cheema
(74) *Attorney, Agent, or Firm* — Finnegan, Henderson, Farabow, Garrett & Dunner, L.L.P.

(57) ABSTRACT

A classifier 81 classifies target data into a cluster on the basis of a mixture model defined using two different types of variables that indicate features of the target data. In this classification, the classifier 81 classifies the target data into a cluster on the basis of a mixture model in which a mixing ratio of the mixture model is represented by a function of a first variable and in which the element distribution of the clusters into which the target data is classified is represented by a function of a second variable.

9 Claims, 4 Drawing Sheets

(56) References Cited

OTHER PUBLICATIONS

Glenn De'Ath, "Multivariate Regression Trees: A New Technique for Modeling Species-Environment Relationships", Ecology, 83(4), pp. 1105-1117.

Mao Hayakawa et al.; "A Prediction Model of Finish Dates of Job Hunting Based on Stratification Tree and Mixture Weibull Distribution", Proceedings of the $36^{th}$ Symposium on Information Theory and its Applications (SITA201;3), The Institute of Electronics, Information and Communication Engineers, Engineering Sciences Society, pp. 442-447, (2013).

Kan Yamagami et al.; "Senzai Class Model No Kongohi Ni Chakumoku Shita Clustering Shuho No Teian". Japan Industrial Management Association 2014 Nen Shuki Taikai Yokoshu, Japan Industrial Management Association, pp. 132-133, (2014).

* cited by examiner

CLUSTERING SYSTEM, METHOD, AND PROGRAM

CROSS-REFERENCE TO RELATED PATENT APPLICATIONS

This application is a National Stage Entry of International Application No. PCT/JP2016/000403, filed Jan. 27, 2016, which claims the benefit of priority from U.S. Provisional Patent Application No. 62/117,659, filed Feb. 18, 2015. The entire contents of the above-referenced applications are expressly incorporated herein by reference.

TECHNICAL FIELD

The present invention relates to a clustering system, a clustering method, and a clustering program for clustering classification target data by using a mixture model.

BACKGROUND ART

Data division by clustering is one of the most basic methods in data mining. Situations in which a great deal of data is divided to generate a plurality of segments include clustering documents, stores, or the like, for example. In the case of clustering documents, for example, it is possible to perform clustering by dividing data on the basis of the presence or absence of a word which may appear in each document to venerate a topic segment. Moreover, in the case of clustering stores, segments including a group of stores similar in sales can be generated by clustering sales feature vectors having sales of individual products as elements in the k-means method, for example.

Clustering methods include various methods in addition to the above k-means method. For example, as a method of solving a clustering problem by using a probabilistic model, there is known a mixture model in which a data generation probability is represented by a linear sum of multiple probabilities.

Moreover, Non Patent Literature (NPL) 1 describes multivariate regression trees (MRT) which is used for searching, describing, and predicting a relationship between multiple types of data and environmental characteristics. The MRT described in NPL 1 forms clusters by repeating data division based on a simple rule which is based on an environmental value.

CITATION LIST

Non Patent Literature

NPL 1: Glenn De'ath, "MULTIVARIATE REGRESSION TREES: A NEW TECHNIQUE FOR MODELING SPECIES-ENVIRONMENT RELATIONSHIPS," Ecology, 83(4), 2002, pp. 1105-1117

SUMMARY OF INVENTION

Technical Problem

On the other hand, even if it is attempted to cluster stores on the basis of a sales feature vector, the stores cannot be appropriately clustered problematically when the target stores are new stores. It is because new stores do not have sales information indicating the features of a cluster, by which the new stores cannot be classified on the basis of sales information. This leads to a technical problem that the foregoing general mixture model is inefficient to classify this kind of data appropriately.

In addition, the MRT described in NPL 1 has a problem that exactly the MRT does not represent a probabilistic model, but applicable models are limited in the MRT. Moreover, data treated in the MRT described in NPL 1 is limited to data represented by continuous values and therefore it is difficult to generate the aforementioned document clusters, for example.

Therefore, it is an object of the present invention to provide a clustering system, a clustering method, a clustering program capable of appropriately clustering classification target data by using a mixture model independently of whether or not the classification target data has information indicating the features of a cluster.

Solution to Problem

According to the present invention, there is provided a clustering system including a classifier which classifies target data into a cluster based on a mixture model defined by using two different types of variables representing features of the target data, wherein the classifier classifies the target data into a cluster based on the mixture model in which a mixing ratio of the mixture model is represented by a function of a first variable and in which an element distribution of the cluster into which the target data is classified is represented by a function of a second variable.

Furthermore, according to the present invention, there is provided a clustering method, wherein a computer classifies target data into a cluster based on a mixture model defined by using two different types of variables representing features of the target data, and wherein, in the classification, the computer classifies the target data into a cluster based on the mixture model in which a mixing ratio of the mixture model is represented by a function of a first variable and in which an element distribution of the cluster into which the target data is classified is represented by a function of a second variable.

Furthermore, according to the present invention, there is provided a clustering program for causing computer to perform classification processing of classifying target data into a cluster based on a mixture model defined by using two different types of variables representing features of the target data and to classify the target data into a cluster based on the mixture model in which a mixing ratio of the mixture model is represented by a function of a first variable and in which an element distribution of the cluster into which the target data is classified is represented by a function of a second variable in the classification processing.

Advantageous Effects of Invention

According to the present invention, the aforementioned technical means provides a technical effect that classification target data is able to be clustered by using a mixture model independently of whether or not the classification target data has information indicating the features of a cluster.

DESCRIPTION OF EMBODIMENT

Hereinafter, exemplary embodiments of the present invention will be described with reference to appended drawings.

Exemplary Embodiment 1

Figure 1:
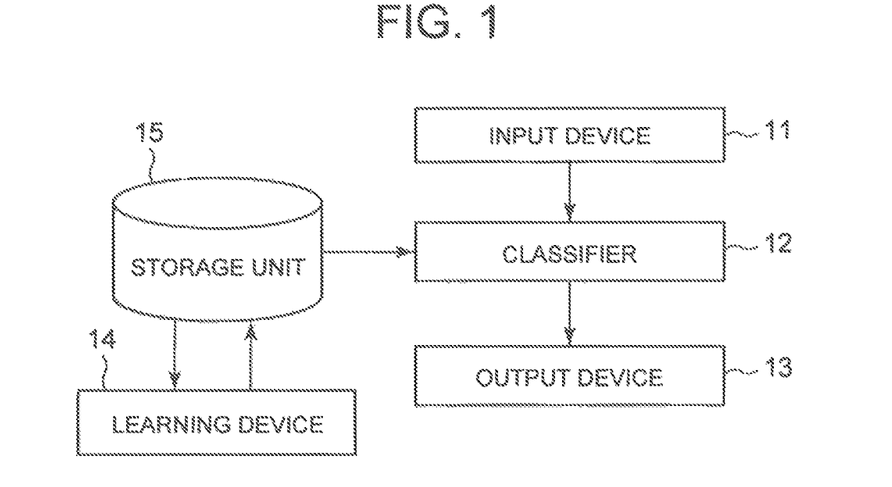
FIG. 1 is a block diagram illustrating a configuration example of a first exemplary embodiment of a clustering system according to the present invention.

FIG. 1 is a block diagram illustrating a configuration example of a first exemplary embodiment of a clustering system according to the present invention. The clustering system of this exemplary embodiment includes an input device 11, a classifier 12, an output device 13, a learning device 14, and a storage unit 15.

The input device 11 receives an input of classification target data. Furthermore, the input device 11 may receive an input of a parameter necessary for model optimization simultaneously therewith.

The storage unit 15 stores a model which is used by the classifier 12 for clustering. The storage unit 15 may store previously-learned model or may store a model learned by the learning device 14 described later. Moreover, the storage unit 15 may store learning data used for model learning or a clustering result based on the learning data. The storage unit 15 is implemented by a magnetic disk or the like, for example.

The classifier 12 clusters input data on the basis of the model stored in the storage unit 15. In this exemplary embodiment, the classifier 12 computes data segments by using probabilistic conditional clustering models (PCCs) which are a type of mixture model.

The PCCs are mixture models defined by using two different types of variables indicating the features (attributes) of target data. As the two types of variables, condition variables and feature variables are supposed.

The condition variables are used to represent conditions under which the target data is assigned to segments and are used as conditions for a prior distribution of cluster classification variables (latent variables). Moreover, the feature variables are used to represent statistics in which segments are characteristic and are used for element distribution (component distribution). For example, in the case of performing clustering based on the store sales, the feature variable corresponds to the sales and the condition variable corresponds to store demographics of each store or the like.

In other words, it can be said that the two different types of variables include variables used for component distribution and variables not directly used for component distribution.

Hereinafter, a method of clustering target data by using PCCs will be described in detail. As described above, two types of variables (condition variables and feature variables) are used in PCCs. The condition variables are used to represent a segment structure (in other words, conditions used for assigning the target data to segments). In this exemplary embodiment, it is assumed that the condition variables are able to be used in either stage of a prediction stage and a learning stage.

The feature variables are used to characterize segments (in other words, for statistics in which segments are characteristic). In this exemplary embodiment, there is also supposed a case where the feature variables are allowed to be used only in the learning stage. Specifically, in this exemplary embodiment, there is also supposed a case where target data does not include information indicated by feature variables in the prediction stage.

In this exemplary embodiment, there are two major problems in the case of clustering target data not including information indicated by feature variables. One problem is to find a compact and interpretable cluster in the prediction stage in the same manner as typical clustering. The other problem is to predict a cluster assignment of the aforementioned target data (specifically, acquired new data) on the basis of only condition variables in the prediction stage.

This corresponds to a case where new stores are assigned on the basis of only known condition variables when new stores are to be clustered on the basis of sales and if the sales (feature variables) of new stores are unknown while the demographics (condition variables) of the new stores are known.

Description will be made on a method of predicting the cluster assignment of target data on the basis of condition variables and feature variables and on a method of predicting the cluster assignment of target data on the basis of only condition variables, while comparing the methods with each other. In this exemplary embodiment, the classifier 12 is allowed to assign the target data to a cluster in both cases in the same manner in the prediction stage.

Note that condition variables are denoted by $X^c$ and feature variables are denoted by $X^f$. The $X^c$ range covers values indicating numerical values or divisions or mixtures thereof. The dimensions of $X^c$ are denoted by $D^c$. Moreover, the range of $X^f$ depends on use (for example, a cluster shape in a probabilistic model) and the dimensions of $X^f$ are denoted by $D^f$.

Although the present invention will be described in the case of unsupervised clustering in this exemplary embodiment, the clustering system of this exemplary embodiment is also applicable to supervised clustering similarly. If the clustering system of this exemplary embodiment is applied to supervised clustering, it is supposed that the classifier 12 has target variables $Y^f$ depending on $X^f$.

PCCs of this exemplary embodiment are defined by equation 1 illustrated as follows by using the foregoing $X^c$ and $X^f$.

[Math. 1]

$$p(X^f \mid X^C; \theta) = \sum_{k=1}^{K} w_k(X^C; \eta_k) p(X^f; \phi_k) \quad (1)$$

In the equation 1, $\theta = (\eta_1, \ldots, \eta_K, \varphi_1, \ldots, \varphi_k)$ is a parameter of the entire model and $\eta_k$ and $\varphi_k$ are parameters representing the condition and shape of the k-th cluster. In addition, in the equation 1, $w_k$ is a function which defines a condition belonging to the k-th cluster.

A cluster classification variable $Z=(Z_1, \ldots, Z_K)$ will be defined here. If $Z_k=1$, it means that data is generated from the k-th cluster. If $Z_k=0$, it means that data is not generated from the k-th cluster.

When the cluster classification variable Z is used, a simultaneous distribution of $X^f$ and $Z_k$ in the case where $X^c$ is given is defined by an equation 2 and an equation 3 illustrated below. As illustrated in the following, the equation 2 is a probability distribution for assigning the target data to a duster and the equation 3 is a probability distribution representing the shape of each cluster, where the contents of the probability distribution are arbitrary.

[Math. 2]

$$p(Z \mid X^C; \beta) = \prod_{k=1}^{K} w_k(X^C; \eta_k)^{Z_k} \quad (2)$$

[Math. 3]

$$p(X^f \mid Z; \phi) = \prod_{k=1}^{K} p(X^f; \phi_k)^{Z_k} \quad (3)$$

It is apparent that this model is a variation of a mixture model. Specifically, this model is similar to a normal mixture model in a Gaussian distribution such as a Gaussian mixture model or in a component distribution $p(X^f; \varphi_k)$ which can be represented by a linear regression such as a mixture of experts model.

Note that, however, the model illustrated in the above equation 1 is a mixture model defined using two different types of variables $X^c$ and $X^f$ and the model is different from the aforementioned model in that the mixing ratio of the mixture model is represented by a function of the condition variables $X^c$. Specifically, as for the model illustrated in the above equation 1, the mixing ratio of the mixture model is represented by the function of the condition variables and the component distribution of the cluster as a classification destination is represented by the function of the feature variables. The classifier 12 clusters the classification target data on the basis of the mixture model.

As a method of assigning the target data to a cluster on the basis of condition variables and feature variables and a method of assigning the target data to a cluster only on the basis of condition variables, there are possible two types of methods illustrated in the following equations 4 and 5.

[Math. 4]

$$\underset{k}{\mathrm{argmax}}\, p(Z_k = 1 \mid X^C, X^f; \theta) = w_k(X^C; \eta_k) p(X^f; \phi_k) \quad (4)$$

[Math. 5]

$$\underset{k}{\mathrm{argmax}}\, p(Z_k = 1 \mid X^C, \eta_k) = w_k(X^C; \eta_k) \quad (5)$$

The equation 4 is a method of assigning the target data to a cluster on the basis of condition variables and feature variables, and the equation 5 is a method of assigning the target data to a cluster only on the basis of condition variables. The method illustrated in the equation 4 is a standard method for finding a cluster which maximizes a posterior probability.

In the method illustrated in the above equation 4, however, data not including the feature variables $X^f$ in the prediction stage cannot be assigned to a cluster as apparent from that the feature variables $X^f$ are included in the equation 4. On the other hand the equation 5 illustrated in the above does not include the feature variables $X^f$. Specifically, in the method illustrated in the above equation 5, data can be assigned to a cluster on the basis of a prior probability of the condition variables $X^c$.

For example, if both of the sales and store demographics are known, the classifier 12 only needs to derive a cluster which maximizes the probability by using the equation 4 illustrated in the above and is able to derive the cluster which maximizes the probability by using the equation 5 illustrated in the above even if the sales are unknown.

Specifically, the classifier 12 of this exemplary embodiment is able to cluster classification target data by using the above equation 4 or 5 derived from the mixture models (PCCs) illustrated in the above equation 1. Therefore, independently of whether or not the classification target data includes information representing the features of the cluster such as, for example, sales, the classifier 12 is able to classify the classification target data to a cluster appropriately.

The output device 13 outputs a result of clustering. The output device 13 may output, for example, information (for example, a cluster name) for identifying the cluster to which the target data is assigned or information (for example, statistical information or the like of the cluster) representing the features of the cluster. The output contents, however, are not limited to those of the above methods.

The learning device 14 learns a model used by the classifier 12 for clustering. In this exemplary embodiment, preferably the learning device 14 uses the Bayesian learning algorithm for identifying a segment structure from data on the basis of the factorized asymptotic Bayesian (FAB) inference which has been developed in recent years when learning the aforementioned PCCs on the basis of learning data.

The FAB inference provides a principle for dealing with a model selection problem in a latent variable model and reveals a segment structure by (substantially accurately) maximizing the marginalized log likelihood. Furthermore, in the FAB inference, the parameter prior distribution is asymptotically ignored to remove hyper-parameters and to automate the clustering. It is particularly useful in a scenario (unsupervised data division) in which a potential subjective evaluation in a great deal of data is to be provided without adjusting objective parameters.

The learning device 14 stores a learning result in the storage unit 15.

The classifier 12 is implemented by the CPU of a computer which operates according to a program (a clustering program). For example, the program may be stored in a storage unit (not illustrated) provided in a clustering system, so that the CPU reads the program operate as the classifier 12 according to the program.

Moreover, the input device 11, the classifier 12, and the output device 13 may be each implemented by dedicated hardware. Furthermore, the clustering system according to the present invention may be configured by connecting two or more devices physically separated from each other by wired or wireless communication.

Figure 2:
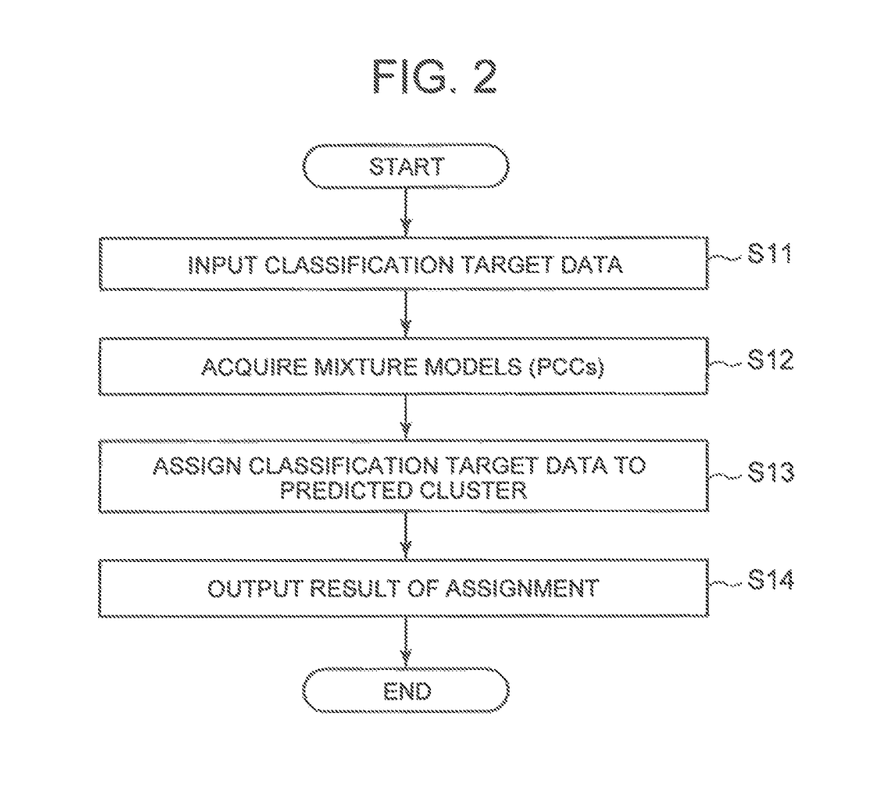
FIG. 2 is a flowchart illustrating an operation example of the clustering system of the first exemplary embodiment.

Subsequently, the operation of the clustering system according to this exemplary embodiment will be described. FIG. 2 is a flowchart illustrating an operation example of the clustering system of this exemplary embodiment. In this operation example, it is assumed that the mixture models (PCCs) defined by using two different types of variables indicating the features of the target data have already been learned and stored in the storage unit 15.

The input device 11 receives an input of classification target data (step S11). The classifier 12 acquires the aforementioned mixture models (PCCs) from the storage unit 15 (step S12). The classifier 12 then predicts a cluster to which the input classification target data belongs on the basis of the acquired mixture models and assigns the classification target data to the predicted cluster (step S13). The output device 13 outputs the result of assigning the classification target data (step S14).

As described above, in this exemplary embodiment, the classifier 12 classifies the target data into a cluster on the basis of mixture models defined by using the two different types of variables which represent the features of the target data. In the mixture models, the mixing ratio is represented by the function of a first variable (specifically, a condition variable) and the element distribution of the cluster into which the target data is classified is represented by the function of a second variable (specifically, a feature variable).

Therefore, independently of whether or not the target data has information indicating the features of the cluster, the target data is able to be clustered appropriately by using the mixture models. For example, even in the case of classifying new data for which feature variables such as sales cannot be used, a dealer is able to predict a cluster into which the new data is classified by using a prior probability conditioned by using a condition variable.

Exemplary Embodiment 2

In the first exemplary embodiment, the conditional prior probability $p(Z|X^c; \eta_k)$ of the equation 1 illustrated in the above has played an important role in the PCCs when the classifier 12 performs clustering. As described in the first exemplary embodiment, the classifier 12 is able to perform clustering by applying an arbitrary probabilistic model to $p(Z|X^c; \eta_k)$.

In this exemplary embodiment, description will be made on a method of performing clustering by using a rule-based conditional prior function for a conditional prior probability in order to increase the easiness to interpret a cluster.

Figure 3:
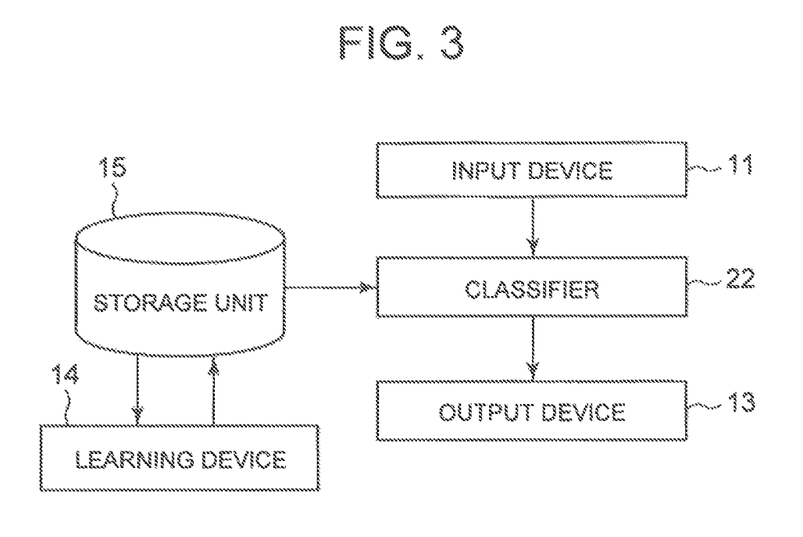
FIG. 3 is a block diagram illustrating a configuration example of a second exemplary embodiment of the clustering system according to the present invention.

FIG. 3 is a block diagram illustrating a configuration example of a second exemplary embodiment of the clustering system according to the present invention. The same reference numerals as those of FIG. 1 are used for the same parts as in the first exemplary embodiment and the description thereof is omitted here. The clustering system of this exemplary embodiment includes an input device 11, a classifier 22, an output device 13, a learning device 14, and a storage unit 15. Specifically, the clustering system of this exemplary embodiment is different from that of the first exemplary embodiment in that it includes the classifier 22 instead of the classifier 12.

The classifier 22 clusters input data on the basis of the model stored in the storage unit similarly to the classifier 12 of the first exemplary embodiment. In this exemplary embodiment, the classifier 22 classifies target data into a cluster by using a rule-based conditional clustering model obtained by improving the PCCs.

Figure 4:
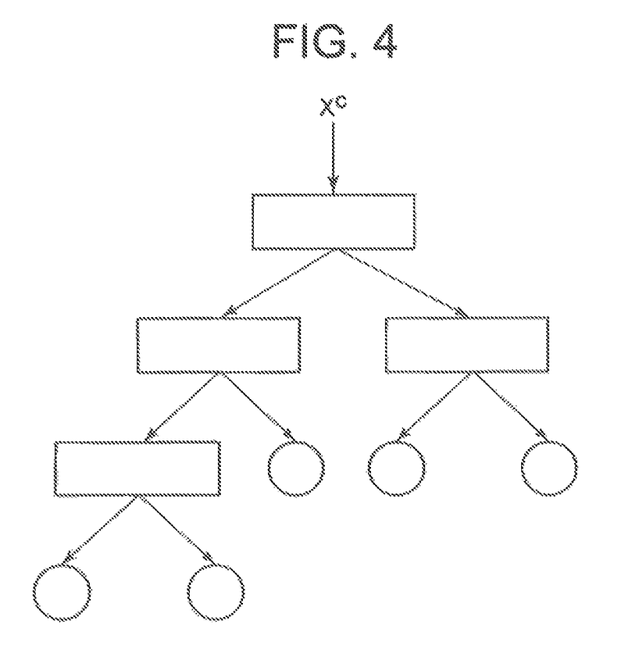
FIG. 4 is an explanatory diagram illustrating an example of a rule-based conditional clustering model.

FIG. 4 is an explanatory diagram illustrating an example of a rule-based conditional clustering model used in this exemplary embodiment. The model illustrated in FIG. 4 is represented by a tree structure, where each node represented by a rectangular shape indicates a condition node and a leaf node represented by a circle indicates a cluster node.

If $X^c$ is input in the uppermost condition node, an appropriate cluster node is selected according to a decision tree rule in the condition node. A Bernoulli function illustrated in the following equation 6 is applied to the condition node.

[Math. 6]

$$g(X_c, \alpha_i) := g_i U(t_i - X^c[\gamma_i]) + (1-g_i) U(X^C[\gamma_i] - t_i) \qquad (6)$$

Reference $\alpha_i$ in the equation 6 is a function ($\alpha_i = (\beta_i, \gamma_i)$) of $\beta i$ and $\gamma i$ and $\beta i$ is a function ($\beta_i = (g_i, t_i)$) of $g_i$ and $t_i$. Note that $g_i \in [0, 1]$ is satisfied $\gamma_i$ is an index related to an element of $X^c$, and $t_i \in R$ (the whole real numbers) is an arbitrary value. Moreover, U in the equation 6 is a step function.

For example, when the equation 6 is used in FIG. 4, $g(X^c, \alpha_i) = g_i$ is satisfied if $X^c[\gamma_i] < t_i$ and $g(X^c, \alpha_i) = 1 - g_i$ is satisfied if $X^c[\gamma_i] \geq t_i$.

If the equation 6 is used in the condition node, $w_k$ used in the equation 1 illustrated in the above is able to be modeled as illustrated in the following equation 7.

[Math. 7]

$$w_k(X^C; \eta_k) = \prod_{i \in C_k} \psi_K^{(i,k)}(X^C) \qquad (7)$$

Here, $C_k = (k=1, \ldots, K)$ is assumed to indicate an index set of the k-th cluster and includes all indices of condition nodes on a unique path from the root node to the k-th cluster node. Moreover, an equation 8 illustrated below represents a probability in the i-th condition node.

[Math. 8]

$$\Psi_k^{(i,k)}(x) := \Psi(g(x, a_i), i, k) \qquad (8)$$

In the equation 8, $\Psi$ is a function of a, i, and k: the function $\Psi$ generates probability a if the k-th cluster is present in the left subtree of the i-th condition node, and otherwise generates probability (1−a). In this case, the right-hand side in the equation 7 represents a probability that the classification target data reaches the k-th cluster node.

The rule-based conditional clustering model described hereinabove can be said to be a model obtained by applying a special probabilistic model to the equations 1 to 3 described in the first exemplary embodiment. The easiness to interpret a model is increased by expressing PCCs in this kind of tree structure. Therefore, the classification condition of each cluster is able to be recognized at a glance, by which a knowledge obtained from a cluster (segment) can be applied to various strategies (for example, a marketing strategy and the like).

Exemplary Embodiment 3

Subsequently, a third exemplary embodiment of the clustering system according to the present invention will be described. In this exemplary embodiment, assuming that stores are classified on the basis of product sales data, description will be made by giving an example of making a plan for opening a new store on the basis of store clusters into which the stores are classified. This product sales data corresponds to the feature variables of the first exemplary embodiment.

Moreover, as described in the exemplary embodiment, the new store does not have product sales data. Therefore, in this exemplary embodiment, it is assumed that store demographic information is used to make a plan for opening a new store. The demographic information corresponds to the condition variables of the first exemplary embodiment.

Figure 5:
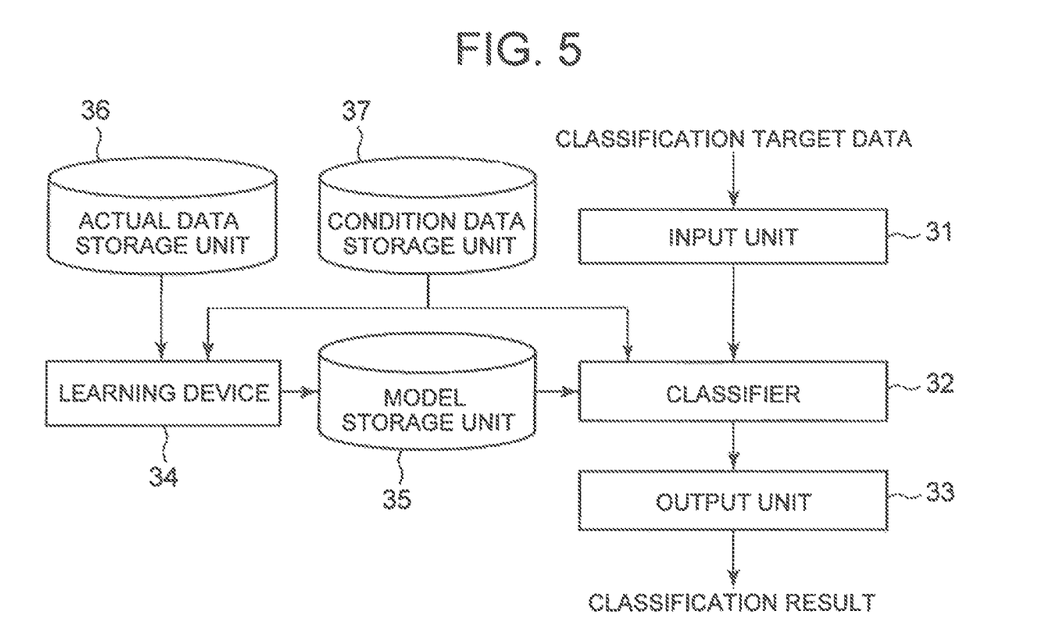
FIG. 5 is a block diagram illustrating a configuration example of a third exemplary embodiment of the clustering system according to the present invention.

FIG. 5 is a block diagram illustrating a configuration example of a third exemplary embodiment of the clustering system according to the present invention. The clustering system of this exemplary embodiment includes an input unit 31, a classifier 32, an output unit 33, a learning device 34, a model storage unit 35, an actual data storage unit 36, and a condition data storage unit 37.

The input unit 31, the classifier 32, the output unit 33, the learning device 34, and the model storage unit 35 of this exemplary embodiment correspond to the input device 11, the classifier 12, the output device 13, the learning device 14, and the storage unit 15 of the first exemplary embodiment, respectively, and therefore detailed description will be omitted here.

The actual data storage unit 36 stores product sales data for each store. The actual data storage unit 36 stores the number of sold products, the sales volume, the sales amount, and the like for each store, for example. Note that, however, the product sales data stored by the actual data storage unit 36 is not limited thereto, but may be information which can be acquired from point of sales (POP) data.

The condition data storage unit 37 stores statistical information on a store able to be acquired when opening a new store. Specifically, the condition data storage unit 37 stores demographic information (for example, population by region or a male-to-female ratio, a percentage by age, and the like) of the store.

The input unit 31, the classifier 32, the output unit 33, and the learning device 34 are implemented by the CPU of a computer which operates according to a program (a clustering program). The input unit 31, the classifier 32, the output unit 33, and the learning device 34 may be each implemented by dedicated hardware. Moreover, the clustering system according to the present invention may be configured by connecting two or more devices physically separated from each other by wired or wireless communication. Furthermore, the model storage unit 35, the actual data storage unit 36, and the condition data storage unit 37 are each implemented by a magnetic disk unit, for example.

Figure 6:
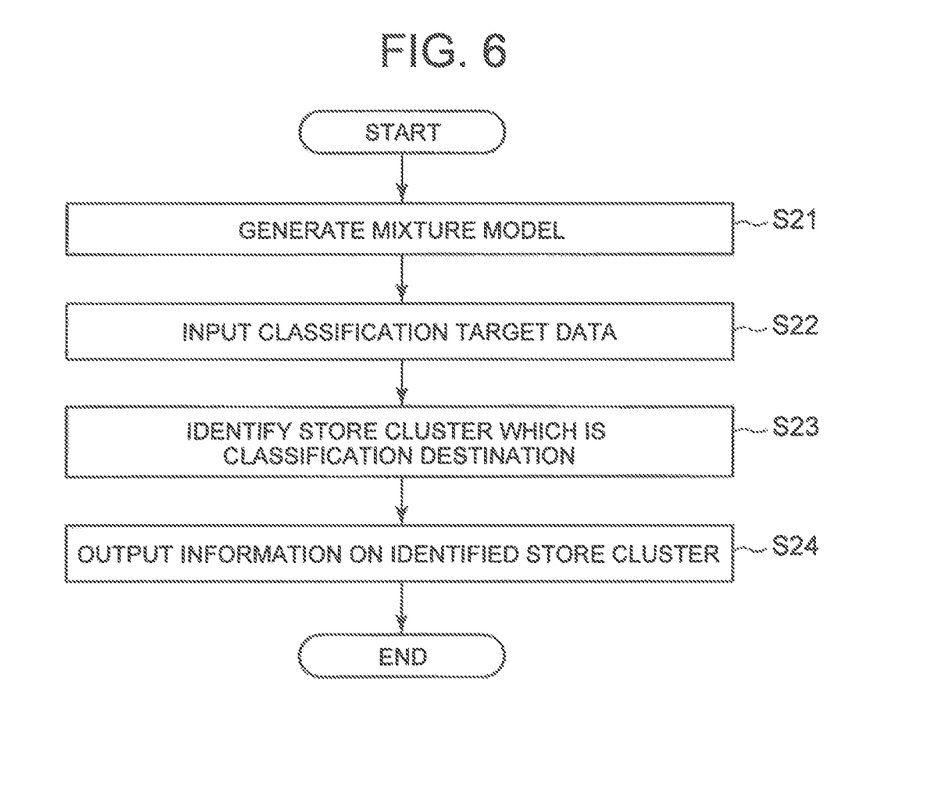
FIG. 6 is a flowchart illustrating an operation example of the clustering system of the third exemplary embodiment.

Subsequently, the operation of the clustering system of this exemplary embodiment will be described. FIG. 6 is a flowchart illustrating an operation example of the clustering system of this exemplary embodiment. The operation example illustrated in FIG. 6 illustrates processing of classifying a new store S not having product sales data into a store cluster.

The learning device 34 generates a mixture model in which the mixing ratio is represented by a function of condition variables (demographic information) and in which the element distribution of a cluster is represented by a function of feature variables (product sales data) on the basis of product sales data and demographic information (step S21) and stores the generated model in the model storage unit 35. The learning device 34 may generate the mixture model on the basis of the FAB inference described in the first exemplary embodiment, for example.

Figure 7:
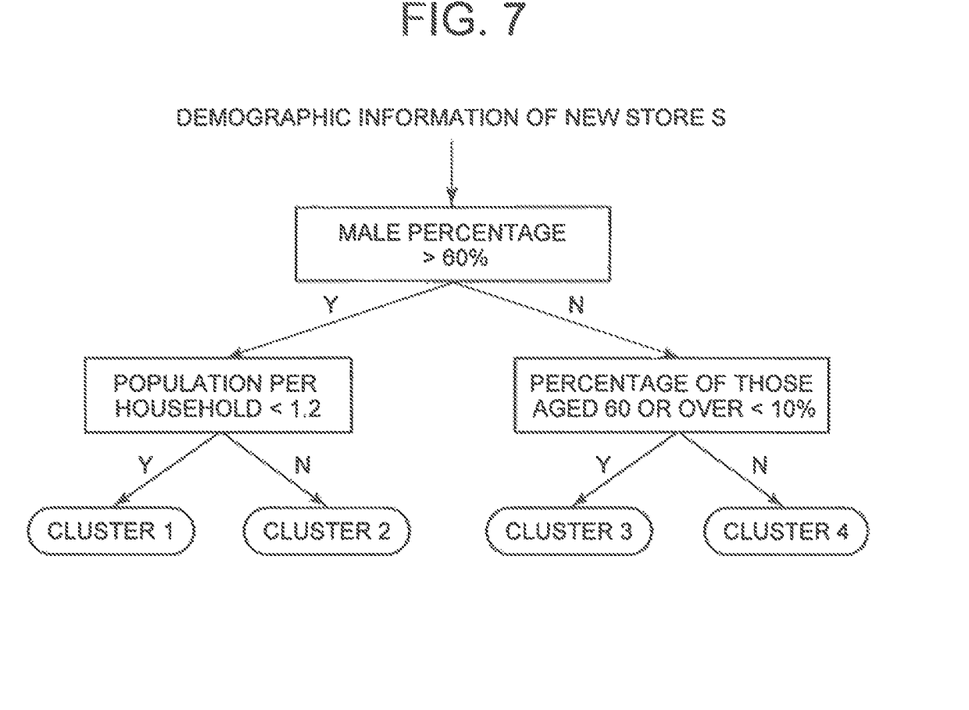
FIG. 7 is an explanatory diagram illustrating an example of a mixture model.

FIG. 7 is an explanatory diagram illustrating an example of a mixture model. In the example illustrated in FIG. 7, there is illustrated a mixture model in which the function of the first variable is represented by a tree structure. Store clusters are arranged in the leaf nodes of the tree structure illustrated in FIG. 7 and the conditions of demographic information are arranged in other nodes. For example, the example in FIG. 7 illustrates that the demographic conditions (a percentage by gender, a population per household, and a percentage by age) are arranged in the condition nodes and that four store clusters are arranged in the leaf nodes.

In the example illustrated in the equation 6, $X^c[\gamma_i]$ corresponds to demographic information: if $X^c[\gamma_i] < t_i$, it corresponds to branching to one node (branching to the other node if $X^c[\gamma_i] \geq t_i$).

The input unit 31 receives an input of target data to be classified (step S22). Specifically, the input unit 31 receives an input of demographic information related to a new store S as information thereof. The classifier 32 identifies a store cluster into which the new store S is classified on the basis of the mixture model stored in the model storage unit 35 (step S23). The output unit 33 outputs information on the identified store cluster (step S24). The output unit 33 may output statistical information obtained aggregating product sales data of the identified store cluster or may output product sales data of the representative store out of the identified store cluster.

As described hereinabove, the clustering system of this exemplary embodiment classifies target stores into a store cluster generated on the basis of the sales. Specifically, the input unit 31 receives an input of demographic information representing the features of the target stores as a first variable and the classifier 32 classifies the target stores represented by the input demographic information on the basis of a mixture model. In this classification, the classifier 32 uses a mixture model in which the mixing ratio is represented by a function of the demographic information and the element distribution of the store clusters is represented by a function of the store product sales data.

The use of this type of mixture models (in other words, PCCs) enables the generation of a cluster based on the sale trends while enabling the description of the information on the cluster by using demographics.

In this exemplary embodiment, there has been described a method of estimating a cluster into which the new store S not having a product sales data is classified by using the mixture model (PCCs). On the other hand, as illustrated in FIG. 7, the mixture model (PCCs) of this exemplary embodiment is able to be represented by a tree structure in which store clusters are arranged in leaf nodes and the conditions of demographic information are arranged in other nodes. Therefore, it is also possible to identify the condition of demographic information which can be used to obtain a desire sales trend by following the condition of the demographic information from a store cluster (leaf node) toward the root node.

Furthermore, while the method of classifying a new store into a store cluster into which the stores are classified by product sales in this exemplary embodiment, the target of the clustering system of this exemplary embodiment is not limited to a new store.

For example, there is a case the power consumption peak value or the minimum value is required to be predicted with respect to a new building or a building for which a part of sensor data are not acquired yet. In this case, the clustering system of this exemplary embodiment is applied by previously clustering an existing building on the basis of power consumption or the like and then using the power consumption as a feature variable and locational conditions, a use of the building, the number of floors, and the like as condition variables, for example. This enables the prediction of a cluster into which the new building is classified, and therefore the power consumption peak value, the minimum value, and the like can be predicted on the basis of the information on this cluster. Moreover, the clustering system of this exemplary embodiment can be used for a demand prediction of a new product, inventory management, and the like, for example, in addition to the new building.

Specifically, even in the case where a new classification target occurs due to a temporal transition and the classification target does not have any data related to a variable characterizing a cluster, the clustering system of this exemplary embodiment is able to classify the classification target into a cluster on the basis of another variable characterizing the classification target.

Figure 8:
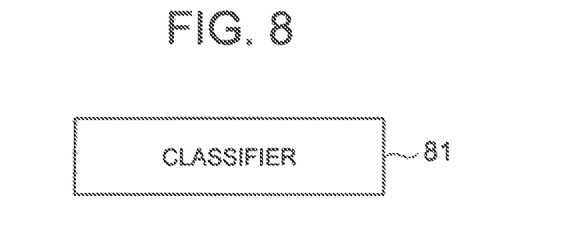
FIG. 8 is a block diagram illustrating an outline of the clustering system according to the present invention.

Subsequently the outline of the present invention will be described. FIG. 8 is a block diagram illustrating an outline of the clustering system according to the present invention. The clustering system according to the present invention includes a classifier 81 (for example, the classifier 12) which classifies the target data into a cluster on the basis of a mixture model (for example, the equation 1 described in the above) defined by using two different types of variables (for example, condition variables and feature variables) representing the features of the target data (for example, a store).

The classifier 81 classifies the target data into a cluster on the basis of a mixture model in which the mixing ratio of the mixture model is represented h a function (for example, $w_k$) of a first variable (for example, a condition variable) and the element distribution of the cluster into which the target data is classified is represented by a function (for example, $p(X^f; \varphi_k)$) of a second variable (for example, a feature variable).

This configuration enables the classification target data to be clustered appropriately by using the mixture model independently of whether or not the classification target data has information indicating the features of the cluster.

Moreover, the classifier 81 may estimate the cluster to which the target data belongs and which maximizes the conditional probability on the basis of the function of the first variable (for example, estimates the cluster by using the equation 5 illustrated in the above) in a state represented by the first variable (for example, store demographic information) for target data (for example, a new store) whose second variable is unknown (for example, product sales data is unknown) and then may estimate the estimated cluster to be a cluster into which the target data is classified.

According to this configuration, even in the case where the classification target data does not have information indicating the features of a cluster, the classification target data is able to be appropriately clustered by using a mixture model. Moreover, even in the case where the classification target data does not have information indicating the features of a cluster, a computer is able to appropriately perform processing of clustering the classification target data by using a mixture model.

Furthermore, the function of the first variable may be defined by a probabilistic model represented by a tree structure in which clusters into which the target data are classified are arranged in leaf nodes and in which the conditions of the first variable are arranged in the condition nodes which are other than the leaf nodes. In addition, the classifier 81 may estimate the cluster optimizing the probabilistic model to be a cluster into which the target data is classified.

According to the configuration, the conditions under which the target data is classified can be recognized at a glance, thereby enabling the classification method of the target data to be interpreted more easily.

Moreover, the clustering system according to the present invention may classify a target store into a store cluster generated on the basis of sales. In this classification, the clustering system may include an input unit (for example, the input unit 31) which receives an input of demographic information indicating the features of the target store as the first variable. In addition, the classifier 81 may classify the target store indicated by the input demographic information into the store cluster on the basis of a mixture model in which the mixing ratio is represented by a function of the demographic information and in which the element distribution of the store cluster is represented by a function of product sales data of the store which is the second variable.

According to the above configuration, stores to be classified are able to be appropriately clustered by using the mixture model independently of whether or not the stores to be classified have the product sales data.

In the above clustering, the function of demographic information may be defined by a probabilistic model represented by a tree structure in which the store clusters into which the target stores are classified are arranged in leaf nodes and the conditions of the demographic information are arranged in the condition nodes. In addition, the classifier 81 may estimate the cluster optimizing the probabilistic model to be a store cluster into which the target store is classified.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

This application claims priority to U.S. provisional application No. 62/117,659 filed on Feb. 18, 2015, the entire disclosure thereof is hereby incorporated herein by reference.

REFERENCE SIGNS LIST

11 Input device
12, 22, 32 Classifier
13 Output device
14, 34 Learning device
15 Storage unit
31 Input unit
33 Output unit
35 Model storage unit
36 Actual data storage unit
37 Condition data storage unit

The invention claimed is:

1. A clustering system comprising:
a hardware including a processor; and
a classifier, implemented by the processor, which classifies target data into a cluster based on a mixture model defined by using two different types of variables representing features of the target data,
wherein the two different types of variables include a first variable and a second variable,
wherein the first variable is a condition variable that represents conditions under which the target data is classified into the cluster and is used as conditions for a prior distribution of latent variables,
wherein the second variable is a feature variable that represents statistics in which segments are characteristic and is used for element distribution,
wherein the classifier classifies the target data into a cluster based on the mixture model in which a mixing ratio of the mixture model is represented by a function of the first variable and in which an element distribution of the cluster into which the target data is classified is represented by a function of the second variable, wherein the mixture model is defined by equation (1):

$$p(X^f \mid X^C; \theta) = \sum_{k=1}^{K} w_k(X^C; \eta_k) p(X^f; \phi_k) \quad (1)$$

wherein θ is a parameter of the mixture model,
wherein $n_k$ and $\varphi_k$ are parameters representing a condition and shape of a k-th cluster, respectively, and
wherein $w_k$ is a function defining a condition belonging to the k-th cluster.

2. The clustering system according to claim 1, wherein the classifier estimates a cluster to which the target data belongs and which maximizes a conditional probability based on the function of the first variable for target data whose second variable is unknown in a state represented by the first variable and estimates the estimated cluster to be a cluster into which the target data is classified.

3. The clustering system according to claim 1, wherein:
the function of the first variable is defined by a probabilistic model represented by a tree structure in which clusters into which the target data are classified is arranged in leaf nodes and in which the conditions of the first variable are arranged in condition nodes which are other than the leaf nodes; and
the classifier estimates a cluster optimizing the probabilistic model to be a cluster into which the target data is classified.

4. The clustering system according to claim 1, wherein:
the clustering system classifies a target store into a store cluster generated based on sales;
the clustering system includes an input unit which receives an input of demographic information indicating the features of the target store as the first variable; and
the classifier classifies the target store indicated by the input demographic information into the store cluster based on a mixture model in which the mixing ratio is represented by a function of the demographic information and in which the element distribution of the store cluster is represented by a function of product sales data of the store which is the second variable.

5. The clustering system according to claim 4, wherein:
the function of demographic information is defined by a probabilistic model represented by a tree structure in which the store clusters into which the target stores are classified are arranged in leaf nodes and in which the conditions of the demographic information are arranged in the condition nodes; and
the classifier estimates a cluster optimizing the probabilistic model to be a store cluster into which the target store is classified.

6. A clustering method, wherein:
a computer classifies target data into a cluster based on a mixture model defined by using two different types of variables representing features of the target data, wherein the two different types of variables include a first variable and a second variable; and
the computer classifies the target data into a cluster based on the mixture model in which a mixing ratio of the mixture model is represented by a function of the first variable and in which an element distribution of the cluster into which the target data is classified is represented by a function of the second variable in the classification, wherein the first variable is a condition variable that represents conditions under which the target data is classified into the cluster and is used as conditions for a prior distribution of latent variables,
wherein the second variable is a feature variable that represents statistics in which segments are characteristic and is used for element distribution,
wherein the mixture model is defined by equation (1):

$$p(X^f \mid X^C; \theta) = \sum_{k=1}^{K} w_k(X^C; \eta_k) p(X^f; \phi_k) \quad (1)$$

wherein θ is a parameter of the mixture model,
wherein $n_k$ and $\varphi_k$ are parameters representing a condition and shape of a k-th cluster, respectively, and
wherein $w_k$ is a function defining a condition belonging to the k-th cluster.

7. The clustering method according to claim 6, wherein the computer estimates a cluster to which the target data belongs and which maximizes a conditional probability based on the function of the first variable for target data whose second variable is unknown in a state represented by the first variable and estimates the estimated cluster to be a cluster into which the target data is classified.

8. A non-transitory computer readable information recording medium storing a clustering program, when executed by a processor, which performs a method for:
classifying target data into a cluster based on a mixture model defined by using two different types of variables representing features of the target data, wherein the two different types of variables include a first variable and a second variable; and
classifying the target data into a cluster based on the mixture model in which a mixing ratio of the mixture model is represented by a function of the first variable and in which an element distribution of the cluster into which the target data is classified is represented by a function of the second variable,
wherein the first variable is a condition variable that represents conditions under which the target data is classified into the cluster and is used as conditions for a prior distribution of latent variables, and
wherein the second variable is a feature variable that represents statistics in which segments are characteristic and is used for element distribution,
wherein the mixture model is defined by equation (1):

$$p(X^f \mid X^C; \theta) = \sum_{k=1}^{K} w_k(X^C; \eta_k) p(X^f; \phi_k) \quad (1)$$

wherein θ is a parameter of the mixture model,
wherein $n_k$ and $\varphi_k$ are parameters representing a condition and shape of a k-th cluster, respectively, and
wherein $w_k$ is a function defining a condition belonging to the k-th cluster.

9. The non-transitory computer readable information recording medium according to claim 8, estimating a cluster to which the target data belongs and which maximizes a conditional probability based on the function of the first variable for target data whose second variable is unknown in a state represented by the first variable and estimating the estimated cluster to be a cluster into which the target data is classified.

* * * * *